United States Patent [19]

Shiomoto

[11] 4,288,354

[45] Sep. 8, 1981

[54] CONCRETE JOINT SEALANT

[75] Inventor: Kiyozo Shiomoto, Hiroshima, Japan

[73] Assignee: AOI Chemical Inc., Shiroshima, Japan

[21] Appl. No.: 140,460

[22] Filed: Apr. 17, 1980

Related U.S. Application Data

[63] Continuation-in-part of Ser. No. 16,179, Feb. 28, 1979.

[30] Foreign Application Priority Data

Aug. 30, 1978 [JP] Japan .............................. 53-105904
Mar. 2, 1979 [GB] United Kingdom ............... 07412/79
Mar. 24, 1979 [TW] Taiwan ................................. 6811135

[51] Int. Cl.$^3$ ............................................. C08L 91/00
[52] U.S. Cl. ....................... 260/28.5 AS; 260/28.5 D; 260/31.8 W

[58] Field of Search .................. 260/28.5 AS, 28.5 D, 260/31.8 W

[56] References Cited

U.S. PATENT DOCUMENTS 3,549,575 12/1970 Payne et al. ................... 260/28.5 D
4,120,832 10/1978 Ceintrey ..................... 260/28.5 AS

*Primary Examiner*—Melvyn I. Marquis
*Attorney, Agent, or Firm*—Stevens, Davis, Miller & Mosher

[57] ABSTRACT

The present invention relates to a concrete joint sealant which is composed of a coal tar mainly consisting of a distillate obtained at up to 350° C., vinyl chloride resin, coal pitch and a mixture of plasticizers, i.e., dioctyl phthalate and dioctyl adipate.

7 Claims, No Drawings

CONCRETE JOINT SEALANT

This is a continuation-in-part application of Ser. No. 16,179 filed Feb. 28, 1979 entitled "Concrete Joint Sealant".

The present invention relates to a concrete joint sealant of uniform quality excelling in stability and resistance to oil.

Joints are present in the concrete pavements of roads, airport runways and parking lots to absorb the expansion or contraction of concrete due to heat condition. These joints without joint sealant, will lead to destruction of the pavement, as the result of sands, stones, rain water or melting snow getting into them. Therefore they are usually sealed with a joint sealant. Conventional joint sealants include pitch type substances like asphalt, rubberized asphalt or natural vulcanized substances of polysulfide synthetic rubber type in the form of two solutions mixed at ambient temperature. Rubberized asphalt requires a long time for heating and melting and is liable to deteriorate by heating.

Polysulfide synthetic rubber is inferior in thermal stability. Particularly, one of the two-solutions blending type is difficult to compound under variations in atmospheric temperature. Accordingly, it is liable to gelate in long storage, resulting in poor workability and an uneven quality in the work after pouring. Also these sealants are required to be resistant to gasoline or jet fuel leaking from vehicles or aircraft on the roads or airport runways, to which these sealants are applied. For this reason, vinyl chloride resin has been added to such sealants. However, sealants limited to containing vinyl chloride resin and coal tar are found inferior in storage stability. To improve the storage stability, U.S. Pat. No. 3,549,575 teaches a joint sealant composed of a coal tar, i.e., a distillate at a specific high boiling point, and vinyl chloride resin. This new sealant although improving stability, cannot form a uniformly elastic bond when applied to the joint, because a part of the coal tar remains unsolved in the joint due to poor solubility. Besides, its resistance to gasoline or jet fuel is not satisfactory.

SUMMARY OF THE INVENTION

The object of the present invention is to provide a concrete joint sealant with high stability and high resistance to oil.

Another object of the present invention is to provide a concrete joint sealant which represents a homogeneous compound of vinyl chloride resin and coal pitch and makes an evenly elastic bond when poured into concrete joints.

Still another object of the present invention is to provide a concrete joint sealant which can be poured by heating to a low temperature, accordingly, suffers little thermal deterioration and can be worked simply and efficiently.

These and other objects of the invention will become more apparent from the following detailed description of the invention referring to its embodiment.

DETAILED DESCRIPTION OF THE INVENTION

The present invention relates to a concrete joint sealant which is composed of a coal tar mainly composed of a distillate at up to 350° C., vinyl chloride resin, coal pitch, and a mixture of plasticizers, i.e., dioctyl phthalate and dioctyl adipate.

The coal tar to be used in the present invention is one mainly composed of a distillate boiling off at up to 350° C. which is said to gelate, when compounded with vinyl chloride resin to produce a joint sealant, and to decrease the stability of the product.

The present invention is predicated upon the discovery that the thermal stability and oil resistance of a joint sealant can be improved by compounding coal tar and vinyl chloride resin with a mixture of specific plasticizers, i.e., dioctyl phthalate and dioctyl adipate and further adding coal pitch thereto.

The coal tar to be used in the present invention is most desirably composed mainly of more than 50% by weight distillate boiling off at up to 350° C. If a coal tar mainly composed of a distillate boiling off at over 350° C. is used and is compounded with vinyl chloride resin and coal pitch, the coal pitch will remain unsolved in the sealant and yield an unstable, poorly elastic bond when poured into the joint. The coal tar used is desirably 10–40 weight % of the total weight of the sealant. If it is used in less than 10 weight %, the anti-aging property of the vinyl chloride resin and the bondability of the sealant will drop. If it is used in more than 40 weight %, the stability of the sealant will be poor.

The coal pitch to be used in the present invention is desirably one with a melting point of 100°–140° C. If its melting point exceeds 140° C., non-solubles will develop, yielding a sealant of uneven quality. If the melting point is lower than 100° C., the sealant obtained is liable to gelate. The pitch is desirably 5–15 weight % of the total weight of the sealant.

The vinyl chloride resin to be used in the present invention may be either a homopolymer or a copolymer.

The copolymer may be formed for example with vinyl acetate or with maleate. This resin is preferably used in the formation of a paste, in a desirable amount of 2–25 weight % of the total weight of the sealant. If the amount used is too much, the viscosity of the sealant will increase, and if it is too little, the sealant will lack elasticity.

As the plasticizer, dioctyl phthalate and dioctyl adipate must be combined. If other plasticizers are employed or the plasticizers are employed singly, a joint sealant with the high stability of the present invention will not be obtained.

The mixture ratio of dioctyl phthalate (DOP) to dioctyl adipate (DOA) can be varied over a wide range. However, the mixture ratio of DOP to DOA is preferably within the range of 19:1 to 4:1 so that a well-balanced sealant is obtained which gives good sol-stability of DOA and good oil resistance. This plasticizer mixture is desirably used in the quantity of 20–40 weight % of the total weight of the sealant so as to retain adequate softness of the sealant and prevent the sealant from becoming too hard at low temperatures.

The joint sealant according to the present invention desirably has added to it a conventional stabilizer, for instance, dibasic lead phosphite in order to improve the aging resistance of the vinyl chloride resin.

For the purpose of viscosity adjustment and volume extension of the sealant, a filler such as calcium carbonate, talc, clay, etc. also may be added to the sealant.

The joint sealant according to the present invention can be prepared by blending the above-mentioned components, preferably, at 5°–30° C. for 60–90 min. in an agitator equipped with a cooler.

Before applying to the concrete joint, the sealant is heated to 120°–160° C. to make flowing into the joint easy. After the sealant is poured it is cooled to the ambient temperature, during which time it solidifies to yield a viscoelastic rubber-like mass, which adheres to the joint concrete.

The present invention will now be described in more detail in the following non-limiting embodiment and test results.

Embodiment

Fifteen parts by weight of coal tar containing 40–65 weight % of a distillate boiling at up to 350° C., 10 parts by weight of coal pitch with a softening point of 105°–108° C. (measured by ball and ring test), 25 parts by weight of dioctyl phthalate and 5 parts by weight of dioctyl adipate were evenly blended in an agitator and then 10 parts by weight of vinyl chloride resin were added under agitation. The speed of the agitator was so controlled that the mass was held to less than 35° C. After uniformly dispersing the vinyl chloride resin, 0.5 parts by weight of dibasic lead phosphite and 35 parts by weight of calcium carbonate were added and agitated until they were uniformly dispersed. Thereafter the agitation was stopped and the mass defoamed. The sealant thus yielded was then bottled.

Stability test

Stability was compared between a sealant prepared according to the present invention, a sealant prepared in the same way except that dioctyl phthalate and dioctyl adipate were omitted, and a sealant prepared in the same way except that dioctyl phthalate was used in 30 weight parts but without dioctyl adipate, by measuring their viscosities after one week of storage at ambient temperature and at 50° C. The results are summarized below in Table I.

TABLE I

|  | Invented Sealant | Sealant containing only tar as plasticizer | Sealant with dioctyl phthalate alone |
|---|---|---|---|
| Viscosity as manufactured (centipoise) | 1500 | 2500 | 1800 |
| Viscosity after 1 week of storage at ambient temperature (centipoise) | 1500 | gelate in 3 days | 2500 |
| Viscosity after 1 week of storage at 50° C. (centipoise) | 1900 | gelate in 3 hours | gelate in 1 week |

The above results show that the sealant according to the present invention which contains both dioctyl phthalate and dioctyl adipate is extremely stable.

Oil resistance property test

Seventy-five grams each of the sealant according to the present invention and an American product containing a coal tar mainly composed of a distillate boiling at over 350° C. were placed in vessels and immersed at 38° C. for 48 hours in a solution of 70% isooctane and 30% toluene. After being lifted out of the solution they were dried and measured for weight loss.

The sealant of the present invention suffered a loss of 0.22%, which is considered to be negligible, whereas the American product suffered a loss of 1.03%.

As described above, the joint sealant according to the present invention excels in both stability and oil resistance.

Since the coal pitch blended with vinyl chloride resin is evenly distributed in the sealant, the sealant, when poured into the joint, makes a uniformly elastic bond. Since it becomes pourable by heating to a low temperature, the sealant suffers less thermal deterioration than the conventional sealant which takes a long time for heating to form a melt. Accordingly, it is simple and efficient to work.

Comparative Example

A stability test and oil resistance property test were carried out with respect to sealants prepared by a method similar to the manner of preparing the Embodiment except for using dioctyl phthalate and dibutyl phthalate separately instead of using dioctyl phthalate and dioctyl adipate together. These sealants were compared with the sealant according to the present invention. The results are shown in the following Table II:

TABLE II

|  | Sealant of Invention Joint use of dioctyl phthalate and dioctyl adipate | Sealants to be compared | |
|---|---|---|---|
|  |  | Containing only dioctyl adipate | Containing only dibutyl phthalate |
| Sol stability (viscosity after 1 week of storage at 50° C.) | 1900 cps | 1500 cps | gelate |
| Reducing amount of oil resistance (immersed for 48 hrs.) | −0.22% | −7.5% | −0.9% |

As is apparent from the results of the above test, the sealant containing only dioctyl adipate has good sol-stability. However, the s.p. (solubility parameter) value of dioctyl adipate is 8.6 and comes close to the s.p. value of jet fuel thus making the oil resistance property thereof extremely bad. Therefore, it cannot be used as a sealant in places such as airfields, highways where the sealant is likely to be exposed to gasoline, jet fuel and the like.

According to the present invention, using dioctyl phthalate and dioctyl adipate together, a sealant having appropriate sol-stability and oil resistance is obtained with a s.p. value (8.9) of dioctyl phthalate and the sealant can be produced at low cost.

In case dibutyl phthalate (s.p. value: 9.4) having a higher s.p. value than dioctyl phthalate is used, the sealant becomes close to a s.p. value (9.6) of polyvinyl chloride, thus making sol-stability thereof extremely bad and useless.

In this connection, "solubility parameter (s.p. value)" is property value of liquid, which becomes a measure for blendability between liquids. Liquids which have close s.p. values are apt to be dissolved each other. Action of solvent for high molecular substances can also be represented by s.p. value. The measurement of s.p. value can be conducted by well known methods such as (1) evaporating energy method, (2) Hildebrand method using physical constant and (3) method for assuming s.p. value from molecular structure.

The following Table III shows s.p. values with respect to the typical examples of polymer, solvent and plasticizer:

TABLE III

| polymer | polyethylene | 8.1 |
|---|---|---|
|  | polystyrene | 9.12 |
|  | polymethyl methacrylate | 9.25 |
|  | polyvinyl chloride | 9.6 |
|  | polyacrylonitrile | 12.75 |
| solvent | n-butane | 6.6 |
|  | n-octane | 7.8 |
|  | toluene | 8.9 |
|  | acetone | 9.8 |
|  | ethanol | 12.8 |
|  | water | 23.41 |
| plasticizer | dioctyl adipate | 8.6 |
|  | dioctyl phthalate | 8.9 |
|  | dibutyl phthalate | 9.4 |
|  | diethyl phthalate | 9.9 |
|  | dimethyl phthalate | 10.5 |

What is claimed is:

1. A concrete joint sealant composed of 10-40 weight % coal tar mainly consisting of a distillate boiling at up to 350° C.; 2-25 weight % vinyl chloride resin; 5-15 weight % coal pitch; and 20-40 weight % of a mixture of dioctyl phthalate and dioctyl adipate as plasticizers.

2. The sealant of claim 1, wherein the compound ratio of dioctyl phthalate to dioctyl adipate is 19:1-4:1.

3. The sealant of claim 1, wherein the vinyl chloride resin is used for paste.

4. The sealant of claim 1, wherein the coal pitch has a melting point of 100°-140° C.

5. The sealant of claim 1, including dibasic lead phosphite, to improve aging resistance of the vinyl chloride resin.

6. The sealant of claim 1, including a filler selected from the group consisting of calcium carbonate, talc and clay.

7. A process for manufacturing a concrete joint sealant comprising compounding a 10-40 weight % coal tar mainly composed of a distillate boiling up t 350° C., 2-25 weight % vinyl chloride resin, 5-15% weight % coal pitch and 20-40 weight % of a mixture of dioctyl phthalate and dioctyl adipate.

* * * * *